Feb. 19, 1963   E. R. WOLCOTT   3,078,403
ULTRASONIC TRANSDUCER
Filed Feb. 24, 1956   2 Sheets-Sheet 1

INVENTOR.
EDSON R. WOLCOTT
BY
ATTORNEY

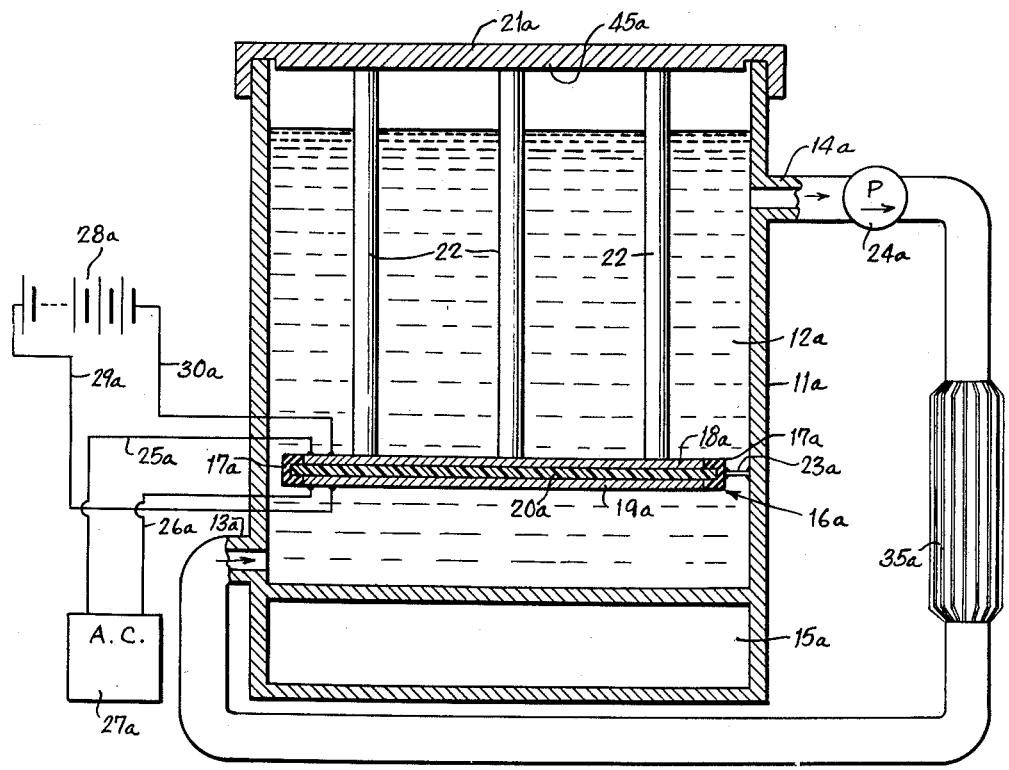

United States Patent Office 3,078,403
Patented Feb. 19, 1963

3,078,403
ULTRASONIC TRANSDUCER
Edson R. Wolcott, 917 Crenshaw Blvd.,
Los Angeles, Calif.
Filed Feb. 24, 1956, Ser. No. 567,641
4 Claims. (Cl. 318—116)

This invention is concerned with an ultrasonic transducer. More specifically, a transducer according to this invention is an electrically operated type of transducer for producing mechanical pressure waves having an ultrasonic frequency.

Heretofore, there have been various types of electrically operated transducers for producing mechanical pressure waves in ultrasonic range of frequencies. However, all of the known types of electrically actuated transducers employ one of two basic arrangements. Either they make use of piezo-electric crystals or magneto strictive material is employed. In either of these arrangements it has been found that a relatively low limit exists for the ability of such transducers to create mechanical pressure waves having sufficient amplitude or power to accomplish desired results. In addition, transducers employing piezo-electric materials are limited to specific resonant frequencies, as controlled by the vibrating element in each case. For this latter reason, experimentation to determine an optimum frequency for carrying out a given operation, is rendered prohibitive in its cost since a whole series of piezo-electric crystals would have to be made up to cover any given range of frequencies desired. The cost of any such set-up will be apparent to anyone skilled in the art, as it is well-known that a piezo-electric crystal must be carefully cut to definite dimensions in order to successfully operate at a known frequency, and each crystal will only respond to its own resonant frequency for producing even the limited power which is obtainable.

In view of the above difficulties and drawbacks involved in known types of transducers, it is an object of this invention to provide an electrically operated transducer which overcomes these difficulties.

Another object of this invention is to provide an electrical type of ultrasonic transducer which may be operated at given frequencies over a wide range, without changing a crystal or the like. The given frequency may be determined by the application of an electric oscillator controlled A.C. potential.

Another object of this invention is to provide an electrically operated transducer, which employs capacitive electrodes that are separated by a dielectric material; which dielectric may be ionized to produce electrons or ions therein. In this manner the electrodes may be caused to vibrate at ultrasonic frequencies, by application thereto of high voltage A.C. potential having a desired frequency. This application is made while the dielectric is maintained ionized so as to provide electrons, and ions that are subject to the A.C. potential.

Briefly, the invention includes an ultrasonic transducer for electrically producing mechanical pressure waves within a range of frequency from the high audio frequencies to the lower radio frequencies. Such transducer comprises means for providing a high voltage A.C. potential having frequencies within the said range of frequencies. The transducer also includes capacitive electrodes having an ionizable dielectric therebetween. In addition, the transducer includes means for ionizing said dielectric, and means for applying said A.C. potential across said electrodes as well as means for transmitting said pressure waves from at least one of the electrodes to a location for utilizing such waves, but the transducer of the invention is definitely distinguished from the prior art because of the absence of either a piezo-electric crystal or a magnetostrictive material.

Preferred embodiments of the invention are described in greater detail below and illustrated in the drawings in which:

FIG. 3 is a schematic illustration of still another embodiment of the invention, showing the transducer in vertical cross-section.

Figure 1:
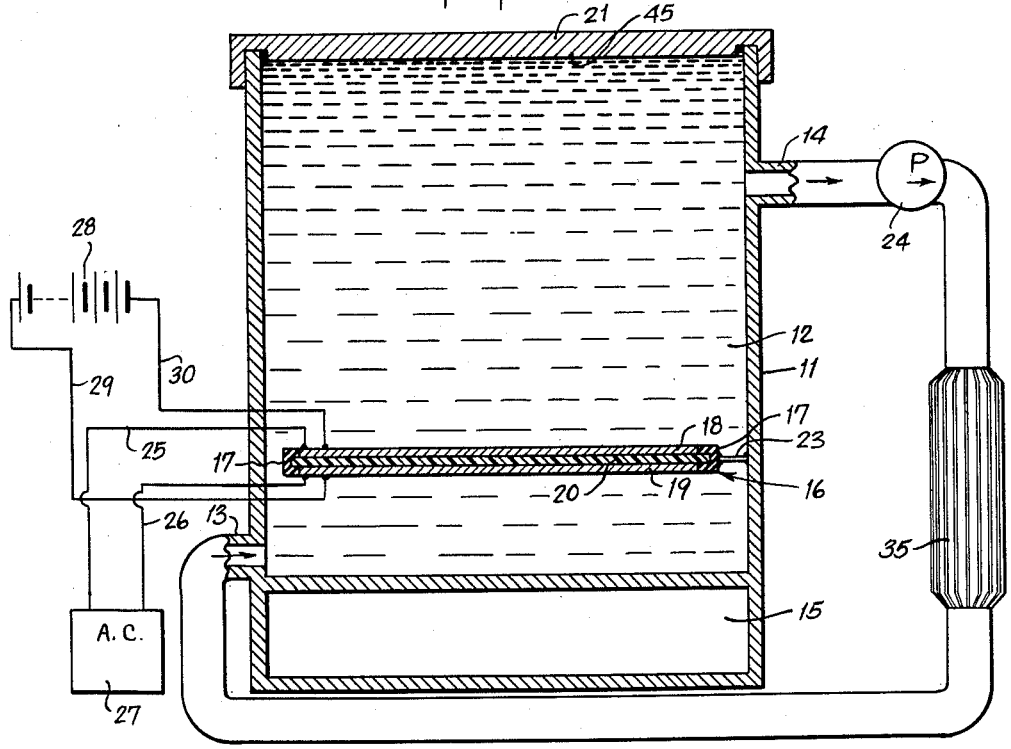
FIG. 1 is a schematic illustration of one embodiment of the invention showing the transducer in vertical cross-section including electric circuits in connection therewith.

FIGURE 1 Embodiment

FIG. 1 illustrates one embodiment of the invention wherein there is a container 11 that may take any geometrical shape desired. There is a body of liquid 12 in the container 11. This liquid 12 has a dual purpose. It is primarily relied upon to transmit mechanical vibrations as hereinafter set forth and it is circulated for cooling purposes, into and out of a pair of spouts or openings 13 and 14. The cooling circuit for this liquid includes any feasible pump 24 and heat transfer coil or radiator 35, etc., for circulating and cooling the liquid 12 to remove excess heat from a transducer unit 16 that is immersed in the liquid. At the bottom of the container 11 there is an evacuated space 15 which is provided to prevent the transmittal of the ultrasonic pressure waves in a downward direction.

Conveniently located, and submerged in the liquid 12 within container 11, there is the transducer unit 16 which includes a pair of electrodes 18 and 19. These electrodes 18 and 19 may be constructed of any satisfactory conductive material, e.g. copper or the like, and are physically separated by a layer 20 of a certain type of dielectric material. The thickness of this material 20 is greatly exaggerated in the drawing for purposes of illustration, since it will probably be only a few millimeters thick.

The dielectric material 20 is preferably a solid dielectric which when punctured will tend to liquify by reason of the discharge, so as to seal itself. For example, nylon soaked in wax or a suitable plastic. Other dielectric materials of this nature may be used also, e.g. a silicone or many other similar compounds. Of course, the dielectric compound used should not be soluble in the oil or other liquid 12 that is used to cool and to transmit the ultrasonic waves unless it is sealed off from contact therewith as in the arrangement of FIGS. 1 and 3.

Dielectric material 20 may also be a liquid of the so-called electrolytic type. This type of dielectric is well known in the electrolytic condenser field. The dielectric material may take the form of a saturated inert fibrous material or a saturated relatively inert porous resilient material, e.g. a woven or otherwise porous nylon or the like, may be saturated with any one of a number of electrolytic dielectric fluids. The use of a fluid dielectric provides the presence of a material which may be ionized while maintaining the dielectric qualities thereof.

It is contemplated that the dielectric material should be in effect slightly conductive so as to provide the desired ionization which gives the desired effects. Consequently the term "ionizable dielectric," as used throughout this application, including the claims, is intended to mean a dielectric material having something less than the usually acceptable insulating qualities.

In order to keep the dielectric fluid in the transducer unit 16 from mixing with the cooling liquid 12 there are edges 17 of insulating material that are bonded to, or otherwise maintained in a tightly sealed relation with the electrodes 18 and 19. In addition, the unit 16 is mechanically supported within the container 11 in any convenient manner, such as by attaching the edges 17 to the side walls of container 11 by a plurality of wires or rods 23 (only one of which is shown).

It will be noted that there is a cover 21 over the top of the container 11. This cover has a thick central area 45 which extends down into the liquid 12 so that a major portion of the cover 21 is in good contact with the liquid or oil 12 at all times. In this way the flat top of the cover 21 may be used as a platform where the mechanical pressure waves are disseminated. These waves will be readily transmitted from the transducer unit 16 to the platform formed by cover 21 by reason of the fact that the liquid 12 is a relatively incompressible one. It is pointed out that the terms "relatively incompressible" as used here refer to a change in volume of the liquid under pressure, and not to the ability to transmit mechanical pressure waves. This is particularly true since liquids of this type are excellent conductors of this type of waves, as are many solids such as iron, steel and the like.

Attached to the electrodes 18 and 19 there is an electric circuit which includes a pair of wires 25 and 26 that lead to a high voltage A.C. source 27 where an ultrasonic frequency, high voltage A.C. potential is generated. In addition to this A.C. circuit, there is a circuit for applying an ionizing D.C., such as that indicated by a battery 28. The D.C. potential is connected across the dielectric 20 between the electrodes 18 and 19 via a pair of wires 29 and 30. The amplitude of this D.C. potential is such as to cause ionization of the dielectric material 20 so that there exists in the ionized portion of the dielectric an ample quantity of free electrons and ions that will be subject to the high voltage A.C. potential from source 27.

The A.C. source 27 is a standard element and may take various well-known forms. However, it is contemplated that the A.C. potential applied to the electrodes 18 and 19 will be a high voltage so as to provide a large amount of acceleration of the ionized particles in the dielectric 20. Provision of a high voltage A.C., in the order of a million volts, may be had by employing apparatus including a Tesla coil for example. The frequency may be varied over a given range, of course, e.g. by the mere turning of a dial.

It is pointed out that the ions formed in the dielectric material 20 may have different sizes depending upon the material used, among other things. The size ions best suited to a given application may vary with the frequency being employed as well as with the voltage amplitude, etc. The ions should preferably be heavy so as to produce sharp jolts at the electrodes 18 and 19.

*Operation*

The operation of a transducer according to FIG. 1 may be described as follows:

Application of the D.C. voltage 28 connected to the electrodes 18 and 19, causes an ionization of the dielectric 20. The ionization should be enough to create a great quantity of ionized particles in the dielectric material so that there are existing an ample quantity of free electrons and ions, to be acted upon the superimposed A.C. electric potential. Thus when the high voltage A.C. potential is applied from A.C. source 27, via the wires 25 and 26, to the electrodes 18 and 19, the ions are hurled with great force against each of the electrodes 18 and 19 alternately at the frequency of the A.C. potential. In this manner the desired mechanical pressure waves are set up directly at the surface of each of the electrodes 18 and 19, and the amplitude of such pressure waves is relatively great since the electrodes are constructed of metals which have sufficient strength and resiliency.

It will be appreciated that as mechanical energy is produced in the form of vibrations, or mechanical pressure waves, there will be generated considerable quantities of heat. For this reason the cooling liquid 12 is employed. It is to be expected that it will be necessary for the liquid to be circulated through the main chamber of the container 11 while being withdrawn for the purpose of cooling to remove the heat thus generated. However, with best operating efficiency it may be found that the quantity of heat generated is not excessive.

It is to be noted that this liquid 12 may also have the second function of acting as a medium for transmitting the mechanical pressure waves generated in the electrodes, to any convenient location for disseminating these waves by way of utilization thereof, e.g. by treatment or otherwise of any given article that is to be subjected to the waves. In other words, the mechanical pressure waves generated by the transducer 16 will be transmitted through the liquid 12, upward to the cover 21 so that the cover 21 and anything in contact therewith will be vibrated at an ultrasonic frequency; for accomplishing desired results.

Figure 2:
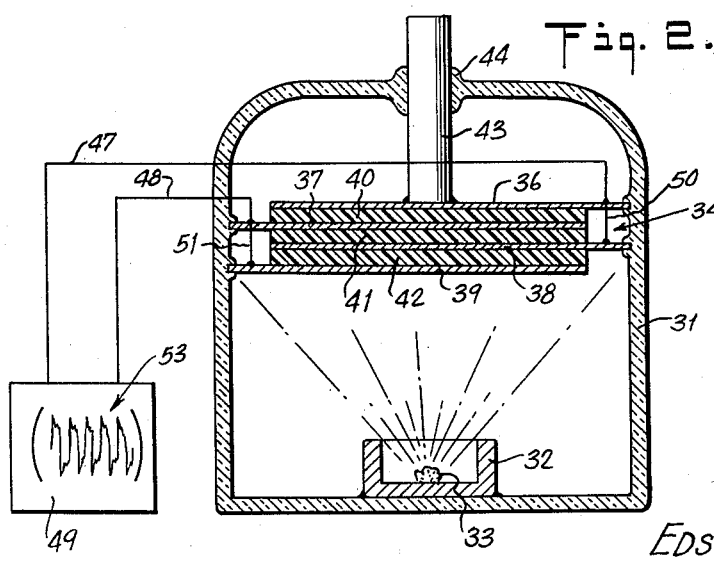
FIG. 2 is a schematic illustration of another embodiment of the invention showing the transducer in vertical cross-section.

*FIGURE 2 Embodiment*

In FIG. 2 there is shown another embodiment of the invention. In this instance there is no D.C. potential employed for ionizing the dielectric material. There is an evacuated container 31 which has a transducer unit 34 therein that includes a plurality of electrodes separated by layers of dielectric material in a manner similar to the transducer unit 16 of FIG. 1. The container 31 may be constructed in any feasible manner and of a material such as heavy glass or the like. Located centrally on the bottom of the container 31 there is a lead, or other radiation shielding-material cup 32. Cup 32 contains a quantity of radioactive material 33, so that radiations will be projected upward against the transducer unit 34, located above.

Transducer unit 34 is made up of compound electrodes, i.e. they include a plurality of conductive material plates 36, 37, 38 and 39. It is contemplated that there may be more than the number of plates illustrated in FIG. 2, if desired; but for the purposes of illustration there are two plates 36 and 38 which go to make up one electrode, while the other two plates 37 and 39 make up the other electrode. As indicated, there is a layer of dielectric material between each pair of the plates 36 through 39, so that there are three layers of dielectric material 40, 41 and 42.

Firmly attached to the upper plate 36 of the transducer unit 34, e.g. by brazing, there is a column or rod 43 which may be constructed of any good conductor of ultrasonic mechanical pressure waves. In order to maintain the vacuum within container 31 there must be a seal 44 located around the rod 43.

There is an electrical circuit that includes wires 47 and 48, in addition to wires 50 and 51, which electrically connect together the pairs of electrode plates 36, 38, and 37, 39, respectively. The wires 47 and 48 lead from a high voltage A.C. potential source 49, having the ability to provide a high voltage A.C. potential at ultrasonic frequencies.

With regard to the A.C. source 49 there is schematically indicated at 53 a showing of the wave form for the potential output thereof, that is to be preferred. This wave form is one having a steep front for each voltage peak while the wave form thereafter is not important. It is preferred that such steep front A.C. potential be employed in order to provide for a maximum force to drive the electrons and ions against the electrodes of the transducer at highest velocities. An example of specific means for obtaining a steep front wave of this type is to be found in a joint Patent Number 1,188,597, of E. R. Wolcott and F. Rieber issued June 27, 1916, entitled "Method and Apparatus for Rectifying Alternating Current." The A.C. wave would be had by connecting two of these rectifiers together with opposite polarity.

It will be appreciated that in the FIG. 2 arrangement the ultrasonic pressure waves will not be transmitted out of the container 31 to an appreciable extent except via the rod 43, since the evacuated space within container 31 is a non-conductor for such waves.

The operation of the FIG. 2 embodiment is substantially the same as that of FIG. 1. However, the ionization of the dielectric materials in layers 40, 41 and 42 is induced by reason of the radiations emanating from the radioactive material 33.

It will be appreciated that although high voltage source 49 is indicated as a particular one having special wave form, it is not necessary that such source only must be used. In fact the high voltage A.C. source 27 described above could be used interchangeably with source 49 and vice-versa. It is contemplated that in most instances the type of high voltage A.C. obtained by a source like that of source 49 will be preferable for all transducers according to this invention.

FIGURE 3 Embodiment

In FIG. 3 there is illustrated another embodiment of the invention. This embodiment is very similar to that of FIG. 1 and the corresponding elements in FIG. 3 have the same reference numbers, with a sub letter "a." as their counter parts in FIG. 1. Since the corresponding elements act in the same way in these two embodiments, only the differences need be discussed. In the FIG. 3 embodiment the upper electrode 18a has attached thereto a plurality of supports or columns 22 which are also attached to the cover 21a. In this manner there is a transmittal of the ultrasonic waves over columns 22, which may be steel or any good conductor of the mechanical pressure waves. Such transmittal over columns 22 is not hampered by an air space between the surface of the liquid 12a and the under side of the cover 21a.

While certain embodiments of the invention have been set forth in considerable detail above in accordance with applicable statutes, this is not to be taken as in any way limiting the invention, but merely as being descriptive thereof.

It is claimed:

1. An ultrasonic transducer for electrically producing mechanical pressure waves within a range of frequency from the higher audio frequencies to the lower radio frequencies comprising means for providing an electric oscillator controlled high voltage A.C. potential in the order of 1,000,000 volts having a predetermined variable frequency within said range of frequencies, capacitive electrodes having an ionizable dielectric devoid of any magneto strictive material therebetween, means for ionizing said dielectric, and means for applying said A.C. potential to said electrodes across said dielectric independent of any piezo-electric unit.

2. An ultrasonic transducer for electrically producing mechanical pressure waves within a range of frequency from the higher audio frequencies to the lower radio frequencies comprising means for providing an electric oscillator controlled high voltage A.C. potential in the order of 1,000,000 volts having a predetermined variable frequency within said range of frequencies, capacitive electrodes having an ionizable liquid dielectric devoid of any magneto strictive material therebetween, means for ionizing said dielectric and means for applying said A.C. potential to said electrodes across said dielectric independent of any piezo-electric unit, and means for transmitting said pressure waves from at least one of the electrodes to a location for utilizing the same.

3. An ultrasonic transducer for electrically producing mechanical pressure waves within a range of frequency from the higher audio frequencies to the lower radio frequencies comprising means for providing a high voltage oscillator controlled A.C. potential in the order of 1,000,000 volts having a predetermined variable frequency within said range of frequencies, said potential having a steep fronted wave form to provide maximum energy for causing said pressure waves, capacitive electrodes having an ionizable dielectric therebetween devoid of any magneto strictive material, means for ionizing said dielectric and means for applying said A.C. potential to said electrodes across said dielectric independent of any piezo-electric unit.

4. An ultrasonic transducer for electrically producing mechanical pressure waves within a range of frequency from the higher audio frequencies to the lower radio frequencies comprising means for providing a high voltage oscillator controlled A.C. potential in the order of 1,000,000 volts having a predetermined variable frequency within said range of frequencies, said potential having a steep fronted wave form to provide maximum energy for causing said pressure waves, capacitive electrodes having an ionizable liquid dielectric therebetween, means for ionizing said dielectric and means for applying said A.C. potential to said electrodes across said dielectric independent of any piezo-electric unit, and means for transmitting said pressure waves from at least one of the electrodes to a location for utilizing the same, said electrodes and dielectric being immersed in a cooling fluid to remove excess heat therefrom.

References Cited in the file of this patent

UNITED STATES PATENTS

| | | |
|---|---|---|
| 1,152,697 | Bodde | Sept. 7, 1915 |
| 1,461,056 | Walker | July 10, 1923 |
| 1,644,387 | Kyle | Oct. 4, 1927 |
| 1,678,182 | Estes | July 24, 1928 |
| 1,809,713 | Kuhnert et al. | June 9, 1931 |
| 1,839,130 | Thomas | Dec. 29, 1931 |
| 1,901,202 | Thomas | Mar. 14, 1933 |
| 2,163,650 | Weaver | June 27, 1939 |
| 2,167,536 | Suits | July 25, 1939 |
| 2,353,920 | Muzzey | July 18, 1944 |
| 2,403,990 | Mason | July 16, 1946 |
| 2,559,227 | Rieber | July 3, 1951 |
| 2,592,703 | Jaffe | Apr. 15, 1952 |
| 2,616,223 | Jonker | Nov. 4, 1952 |
| 2,651,027 | Vogel | Sept. 1, 1953 |
| 2,685,025 | Root | July 27, 1954 |
| 2,708,485 | Vogel | May 17, 1955 |
| 2,728,867 | Wilson | Dec. 27, 1955 |

FOREIGN PATENTS

| | | |
|---|---|---|
| 4,967 | Great Britain | of 1910 |

OTHER REFERENCES

Electroelastic and Pyroelastic Phenomena by W. G. Cady, published in "International Critical Tables," vol. 6, 1929, page 207.

UNITED STATES PATENT OFFICE
CERTIFICATE OF CORRECTION

Patent No. 3,078,403                      February 19, 1963

Edson R. Wolcott

It is hereby certified that error appears in the above numbered patent requiring correction and that the said Letters Patent should read as corrected below.

Column 3, line 57, for "The" read -- This --; line 60, after "upon" insert -- by --.

Signed and sealed this 8th day of October 1963.

(SEAL)
Attest:

ERNEST W. SWIDER
Attesting Officer

EDWIN L. REYNOLDS

Acting Commissioner of Patents